UNITED STATES PATENT OFFICE.

FREDERICK RANSOME, OF LOWER NORWOOD, ENGLAND.

MANUFACTURE OF CEMENT AND ARTIFICIAL STONE.

SPECIFICATION forming part of Letters Patent No. 223,815, dated January 27, 1880.

Application filed November 26, 1879. Patented in England, November 16, 1878.

*To all whom it may concern:*

Be it known that I, FREDERICK RANSOME, of Lower Norwood, England, have invented certain new and useful Improvements in the Manufacture of Cement and Artificial Stone; and I do hereby declare the following to be a full, clear, and exact description of the invention, such as will enable others skilled in the art to which it appertains to make and use the same.

Heretofore Portland cement has commonly been made from chalk or limestone and clay intimately mixed together and subsequently burned in a kiln. The clay used in the manufacture of this cement has hitherto been ordinary impure clays, more especially such as that obtained from alluvial deposits of the Medway and the Thames. Such cements as heretofore made have for some purposes the disadvantage that after they have been used and become set and hardened they are of a brownish color, which deepens considerably when their surface is exposed to wet. This is a serious disadvantage when the cements are required to be used in the manufacture of artificial stone, or for giving an exterior coating to the walls of buildings, and for many other purposes where it is required that the cement shall not be liable to changes of color. I have discovered that by exposing a mixture of previously-washed kaolin and carbonate of lime in the form of marble or other suitable limestone to a strong heat, especially when contained in retorts or muffles, or when otherwise protected from the direct action of the heated products of combustion in the furnace or kiln, an uncolored cement is obtained, and that such cement, after it has been used and become set and hardened, will not be liable to such discoloration.

For some purposes I mix soluble silica with the above-mentioned materials previous to burning. The soluble silica may be such as is found in certain well-known mineral beds, or it may be artificially prepared.

Any desired tint or color may be given to the cement by mixing with it various coloring materials after it has been ground and prepared for use.

I prefer to conduct the manufacture in the following manner: I grind together, in the manner ordinarily practiced by makers of Portland cement, china-clay and chalk, or, preferably, where it can be obtained at a reasonable cost, white marble. These materials are employed advantageously in the proportion of one part, by weight, of china-clay to three parts of the chalk or marble. As in the manufacture of Portland cement, it is essential that the materials should be finely ground and intimately mixed.

As china-clay is usually somewhat deficient in silica, I supply this deficiency by the addition, during the process of manufacture, of soluble silica, such, for example, as that found in the natural beds near Farnham, or, preferably, from the deposits in the New England States, United States of America, so that relative proportions of lime, alumina, and silica shall, after burning, be about — lime, sixty parts; alumina, twelve parts; silica, twenty-two parts.

When it is desired to obtain a colored or tinted cement, I add the necessary pigment, such as ochers or iron oxides, during the grinding.

In place of burning the composition in contact with the fuel, as is usual in the manufacture of Portland cement, I burn it in muffle-kilns or retorts at a bright red heat, and after burning it is ground fine and treated in the manner now usual.

I also produce a cement which is eminently hydraulic by the treatment of limes which contain silica—such, for instance, as that known as "lime of tiel" with alumina in the form of hydrate, or any of its salts, preferably a solution of sulphate of alumina.

I employ the sulphate of alumina in the form of solution of a specific gravity of 1.12 or thereabout. In preparing the lime of tiel, (which is a well-known lime made on the banks of the Rhone,) or other like lime containing silica in large proportion, for use as mortar or in concrete or as a cement, I slake or gage the lime with this solution of alumina in lieu of water, and thereby supply to the lime in an active form the alumina which it requires to compensate the silica.

In place of employing the solution of a salt of alumina, hydrate of alumina suspended in water may be employed in like proportion.

I also produce cement from the artificial sand which is now prepared in large quantities from slag produced in blast-furnaces, and known commercially as "slag-sand." I grind the slag-sand with chalk or other calcareous mineral, and in some cases I also add soluble silica. I burn these materials together, as is usual in the manufacture of cement.

The proportions in which I prefer to use the ingredients are as under: carbonate of lime, from one to two parts; slag-sand, one part.

In the burning operation somewhat less heat will be required than in burning the ordinary ingredients of Portland cement.

These cements are also applicable for the production of molded articles of artificial stone.

The cements are mixed with sand and reduced with water to a proper consistency for molding.

Having thus described the nature of my said invention, and the manner of performing the same, I would have it understood that I claim—

1. The manufacture of a white or artificially tinted cement from a mixture of kaolin or china-clay and chalk or marble, with or without other materials, by burning such mixture in muffle-kilns or retorts without contact with the fuel.

2. The treatment of lime of tiel and like limes containing a large proportion of silica with the solution of a soluble salt of alumina, or with alumina in the form of hydrate.

3. The manufacture of cement by burning a mixture of slag-sand and carbonate of lime.

4. The manufacture of cement and artificial stone, substantially as described.

In testimony that I claim the foregoing I have hereunto set my hand and seal this 11th day of November, 1879.

FREDK. RANSOME. [L. S.]

Witnesses:
 JOHN DEAN,
 GEO. J. B. FRANKLIN,
*Both of No. 17 Gracechurch Street, London, E. C.*